(12) United States Patent
Ito et al.

(10) Patent No.: US 12,429,557 B2
(45) Date of Patent: Sep. 30, 2025

(54) PSEUDO SHEET STRUCTURE, SHEET CONDUCTIVE MEMBER, AND SENSOR DEVICE

(71) Applicant: LINTEC CORPORATION, Tokyo (JP)

(72) Inventors: Masaharu Ito, Tokyo (JP); Takashi Morioka, Tokyo (JP); Taiga Matsushita, Tokyo (JP); Yuma Katsuta, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 437 days.

(21) Appl. No.: 17/911,917

(22) PCT Filed: Mar. 3, 2021

(86) PCT No.: PCT/JP2021/008065
§ 371 (c)(1),
(2) Date: Sep. 15, 2022

(87) PCT Pub. No.: WO2021/187095
PCT Pub. Date: Sep. 23, 2021

(65) Prior Publication Data
US 2023/0139564 A1  May 4, 2023

(30) Foreign Application Priority Data
Mar. 16, 2020 (JP) .................. 2020-045691

(51) Int. Cl.
*G01S 7/40* (2006.01)
*G01S 7/02* (2006.01)

(52) U.S. Cl.
CPC ........... *G01S 7/4047* (2021.05); *G01S 7/023* (2013.01)

(58) Field of Classification Search
CPC ... H05B 3/38; H05B 3/48; H05B 3/84; H05B 3/145; H05B 3/267; H05B 2203/013;
(Continued)

(56) References Cited

U.S. PATENT DOCUMENTS 6,674,392 B1 * 1/2004 Schmidt ............... G01S 13/931
343/873
2002/0011946 A1  1/2002 Artis et al.
(Continued)

FOREIGN PATENT DOCUMENTS

CN  105934802 A  9/2016
CN  107444289 A  12/2017
(Continued)

OTHER PUBLICATIONS

International Search Report issued in corresponding International Patent Application No. PCT/JP2021/008065, dated May 11, 2021, with English translation.
(Continued)

*Primary Examiner* — Tung X Le
(74) *Attorney, Agent, or Firm* — Rimon P.C.

(57) ABSTRACT

A pseudo sheet structure is usable for a sensor configured to emit an electromagnetic wave in a band ranging from 20 GHz to 100 GHz. The pseudo sheet structure includes a plurality of conductive linear bodies arranged at an interval L satisfying a formula (1) below, $0.034 \times \lambda_S \leq L \leq 20$ mm (1). In the formula (1), L is the interval between the plurality of conductive linear bodies, $\lambda_S$ is a wavelength of the electromagnetic wave emitted by the sensor, and a unit for each of L and $\lambda_S$ is mm.

10 Claims, 6 Drawing Sheets

(58) Field of Classification Search
CPC ........ H05B 2203/014; H05B 2203/017; H05B 2214/02; H05B 2214/04; G01S 7/023; G01S 7/4043; G01S 7/4047
See application file for complete search history.

(56) References Cited

U.S. PATENT DOCUMENTS

| | | | |
|---|---|---|---|
| 2006/0086710 | A1 | 4/2006 | Meiler et al. |
| 2013/0251619 | A1 | 9/2013 | Rikihisa et al. |
| 2018/0269559 | A1* | 9/2018 | Celle .................. H05B 3/12 |
| 2018/0301816 | A1 | 10/2018 | Kamo et al. |
| 2019/0293763 | A1* | 9/2019 | Okumura .................. H05B 3/84 |
| 2020/0391698 | A1* | 12/2020 | Fukuda .................. G01S 7/4813 |
| 2021/0337632 | A1* | 10/2021 | Ito .......................... H05B 3/54 |

FOREIGN PATENT DOCUMENTS

| | | |
|---|---|---|
| CN | 108736141 A | 11/2018 |
| CN | 208385631 U | 1/2019 |
| DE | 102014002438 A1 | 8/2015 |
| EP | 3252494 A1 | 12/2017 |
| JP | 3117480 U | 1/2006 |
| JP | 2012-126635 A | 7/2012 |
| JP | 2016-143501 A | 8/2016 |
| JP | 2017-215242 A | 12/2017 |
| JP | 2018-182743 A | 11/2018 |
| JP | 2019-16491 A | 1/2019 |
| JP | 2019-96617 A | 6/2019 |
| JP | 2019-172081 A | 10/2019 |
| JP | 2020-005057 A | 1/2020 |
| JP | 2020-27981 A | 2/2020 |
| WO | 2020/003710 A1 | 1/2020 |
| WO | 2020/045677 A1 | 3/2020 |

OTHER PUBLICATIONS

Extend European Search Report received in corresponding European Patent Application No. 21771283.5 on Feb. 19, 2024.
English translation of the International Preliminary Report on Patentability issued in corresponding International Patent Application No. PCT/JP2021/008065, dated Sep. 20, 2022 with English translation.
Office Action issued for the corresponding Japanese Patent Application No. 2022-508194, dated Feb. 25, 2025.
Office Action issued for the corresponding Chinese patent application No. 202180021199.4 on May 27, 2025.

* cited by examiner

PSEUDO SHEET STRUCTURE, SHEET CONDUCTIVE MEMBER, AND SENSOR DEVICE

CROSS REFERENCE TO RELATED APPLICATIONS

This patent application is the U.S. National Phase under 35 U.S.C. § 371 of International Application No. PCT/JP2021/008065, filed on Mar. 3, 2021, which claims the benefit of Japanese Patent Application No. 2020-045691, dated Mar. 16, 2020, the entire contents of each are hereby incorporated by reference in their entirety.

TECHNICAL FIELD

The present invention relates to a pseudo sheet structure, a sheet-shaped conductive member, and a sensor system.

BACKGROUND ART

Laser, which is currently used in the fields of millimeter-wave radar, AIDAS (Attention Interest Desire Action Satisfaction), traffic sign board, or the like, has, for the millimeter-wave radar for instance, a frequency of 76 GHz (3.9 mm) or 79±4 GHz (3.6 mm, 3.8 mm to 4.0 mm). In another instance, LiDAR (Light Detection and Ranging) uses a communication laser of 950-nm wavelength using silicon or 1550-nm wavelength using gallium arsenic.

Accordingly, the wavelength of the radar to be used is in a range of 900 nm to 1600 nm as used for LiDAR or in a range of 3.5 mm to 4.4 mm as used for the millimeter-wave radar.

Usually, such a radar emits a polarized wave and receives electromagnetic wave, which is created by reflected and returned polarized wave emitted by the radar, to acquire position information. Accordingly, it becomes difficult to acquire accurate position information when an object reflecting or absorbing the polarized wave radiated or emitted by the radar is provided to a top layer of the radar. The polarized wave is prevented from being damped in a car, which has the radar under an emblem thereof, by providing cracks in a metal foil used for the emblem. In another instance, a heater is sometimes used in order to reduce the damping caused by snow attached on the emblem. However, a heater using ITO (Indium Tin Oxide), which significantly damps the electromagnetic wave, is unusable.

For instance, Patent Literature 1 discloses a transparent heat-generating body provided in a manner facing a sensor. The transparent heat-generating body includes a plurality of connecting conductors for connecting a pair of bus-bars. Patent Literature 1 discloses that a resistance value of the heat-generating conductors can be appropriately controlled by specific arrangement direction and folding number of the connecting conductors.

CITATION LIST

Patent Literature(s)

Patent Literature 1: JP 2019-96617 A

SUMMARY OF THE INVENTION

Problem(s) to be Solved by the Invention

As described above, excellent electromagnetic wave transmittance in addition to heating performance is required for the heater installed for a sensor. However, Patent Literature 1 does not disclose detailed conditions for producing a heater having both of excellent electromagnetic wave transmittance and heater function.

An object of the invention is to provide a pseudo sheet structure capable of efficiently transmitting electromagnetic wave and having a heater function. Another object of the invention is to provide a sheet-shaped conductive member provided with the pseudo sheet structure. Still another object of the invention is to provide a sensor system including the pseudo sheet structure or the sheet-shaped conductive member.

Means for Solving the Problem(s)

According to an aspect of the invention, a pseudo sheet structure used for a sensor configured to emit an electromagnetic wave in a band ranging from 20 GHz to 100 GHz is provided, in which the pseudo sheet structure includes a plurality of conductive linear bodies arranged at an interval, and the interval L between the plurality of conductive linear bodies satisfies a formula (1) below.

$$0.034 \times \lambda_S \leq L \leq 20 \text{ mm} \tag{1}$$

In the formula (1), $\lambda S$ is a wavelength of the electromagnetic waves emitted by the sensor, and a unit for each of L and $\lambda_S$ is mm.

In the pseudo sheet structure according to the above aspect of the invention, the interval L between the plurality of conductive linear bodies preferably satisfies a formula (2) below.

$$0.034 \times \lambda_S \leq L \leq 0.86 \times \lambda_S \tag{2}$$

In the formula (2), $\lambda_S$ is the wavelength of the electromagnetic waves emitted by the sensor, and the unit for each of L and $\lambda_S$ is mm.

In the pseudo sheet structure according to the above aspect of the invention, a width D of the conductive linear bodies in a plan view of the pseudo sheet structure preferably satisfies a formula (3) below.

$$D \leq 0.013 \times \lambda_S \tag{3}$$

In the formula (3), $\lambda_S$ is the wavelength of the electromagnetic waves emitted by the sensor, and the unit for each of D and $\lambda_S$ is mm.

In the pseudo sheet structure according to the above aspect of the invention, it is preferable that the electromagnetic wave emitted by the sensor is a linearly polarized wave and the conductive linear bodies are arranged so that a longitudinal direction of the conductive linear bodies is inclined in a range from 70 to 110 degrees with respect to a polarized wave plane of the linearly polarized wave.

In the pseudo sheet structure according to the above aspect of the invention, it is preferable that the pseudo sheet structure is used as a heating device and as an electromagnetic wave filter for restraining transmission of an electromagnetic wave emitted by an oscillation source different from the sensor.

According to another aspect of the invention, a sheet-shaped conductive member including: the pseudo sheet structure according to the above aspect of the invention: and a base member that supports the pseudo sheet structure is provided.

In the sheet-shaped conductive member according to the above aspect of the invention, the pseudo sheet structure is preferably fixed on the base member through a resin layer.

In the sheet-shaped conductive member according to the above aspect of the invention, the resin layer preferably includes a cured product of a curable resin.

According to still another aspect of the invention, a sensor system including: the pseudo sheet structure according to the above aspect of the invention; and a sensor configured to emit an electromagnetic wave in a band ranging from 20 GHz to 100 GHz is provided.

According to further aspect of the invention, a sensor system including: the sheet-shaped conductive member according to the above aspect of the invention; and a sensor configured to emit an electromagnetic wave in a band ranging from 20 GHz to 100 GHz is provided.

According to one of the aspects of the invention, a pseudo sheet structure capable of efficiently transmitting an electromagnetic wave and having a heater function can be provided. According to another of the aspects of the invention, a sheet-shaped conductive member provided with the pseudo sheet structure can be provided. According to still another of the aspects of the invention, a sensor system including the pseudo sheet structure or the sheet-shaped conductive member can be provided.

DESCRIPTION OF EMBODIMENT(S)

An exemplary embodiment(s) of the invention will be described below with reference to the attached drawings. The scope of the invention is not limited by the exemplary embodiment. It should be noted that some parts of the drawings are enlarged or reduced in size for the convenience of description.

First Exemplary Embodiment

Sheet-Shaped Conductive Member

Figure 1:
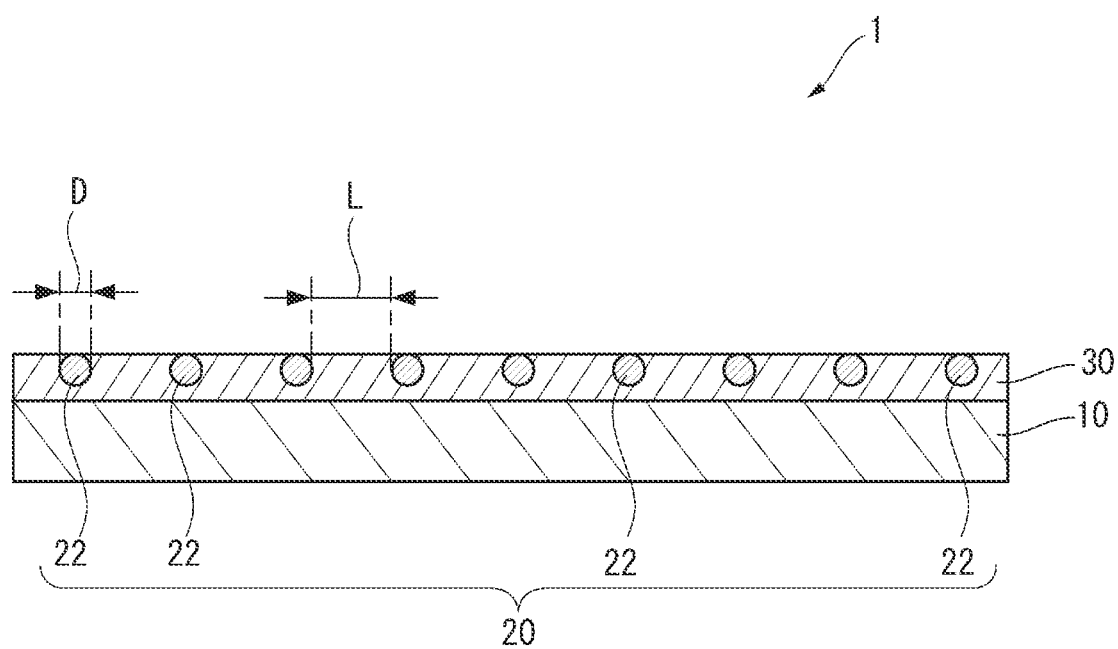
FIG. 1 is a cross-sectional view schematically showing a sheet-shaped conductive member including a pseudo sheet structure according to an exemplary embodiment.

FIG. 1 is a cross-sectional view schematically showing a sheet-shaped conductive member 1 including a pseudo sheet structure 20 according to the present exemplary embodiment.

Figure 2:
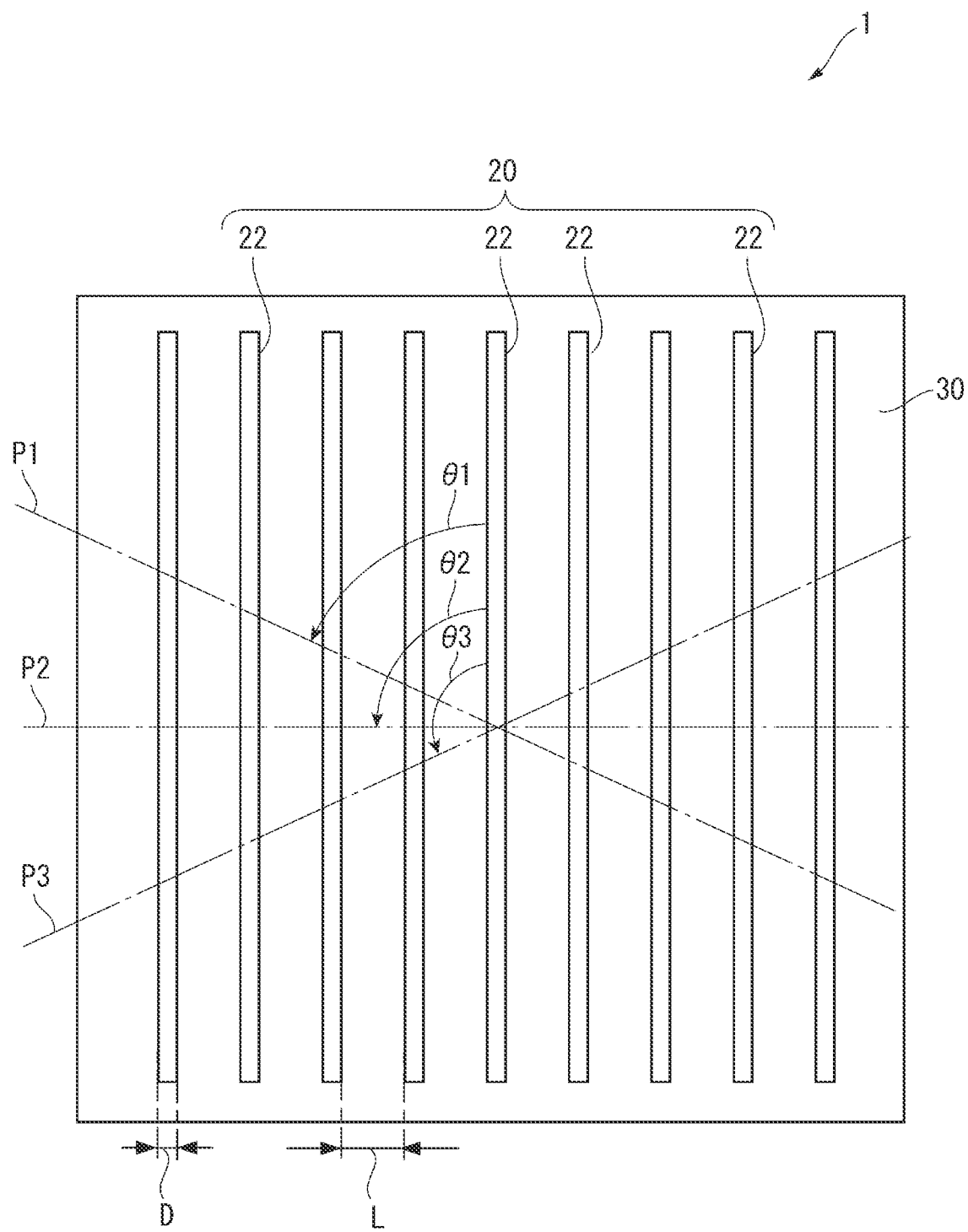
FIG. 2 is a plan view schematically showing the sheet-shaped conductive member including the pseudo sheet structure according to the exemplary embodiment.

FIG. 2 is a plan view schematically showing the sheet-shaped conductive member 1 including the pseudo sheet structure 20 according to the present exemplary embodiment.

The sheet-shaped conductive member 1 according to the present exemplary embodiment includes the pseudo sheet structure 20 and a base member 10 that supports the pseudo sheet structure 20 (see FIGS. 1 and 2). The pseudo sheet structure 20 is fixed on the base member 10 through a resin layer 30 (see FIGS. 1 and 2).

Pseudo Sheet Structure

The pseudo sheet structure 20 of the invention is a sheet-shaped structure in which a plurality of conductive linear bodies 22 are arranged with an interval therebetween.

The pseudo sheet structure 20 according to the present exemplary embodiment is used for a sensor configured to emit an electromagnetic wave whose bandwidth is in a range from 20 GHz to 100 GHz.

The pseudo sheet structure 20 includes the plurality of conductive linear bodies 22. In the pseudo sheet structure 20, the plurality of conductive linear bodies 22 are arranged with an interval therebetween. In other words, the pseudo sheet structure 20 includes the plurality of conductive linear bodies 22 arranged with an interval therebetween. Each of the conductive linear bodies 22 preferably extend in one direction. It is also preferable that the plurality of conductive linear bodies 22 are arranged in parallel to each other.

In the pseudo sheet structure 20 according to the present exemplary embodiment, an interval L between the plurality of conductive linear bodies 22 satisfies a formula (1) below.

$$0.034 \times \lambda_S \leq L \leq 20 \text{ mm} \quad (1)$$

In the formula (1), L is the interval between the plurality of conductive linear bodies 22, $\lambda_S$ is a wavelength of the electromagnetic wave emitted by the sensor provided with the pseudo sheet structure 20, and the unit for each of L and $\lambda_S$ is mm.

It should be noted that the wavelength $\lambda$ [m] for a frequency f [Hz] can be calculated by a formula below.

$$\lambda = c/f$$

c, which is a propagation speed (phase speed) of the electromagnetic wave, is equal to the light speed.

The pseudo sheet structure 20 according to the present exemplary embodiment, in which the interval L between adjoining ones of the plurality of conductive linear bodies 22 satisfies the relationship of $0.034 \times \lambda_S \leq L$ of the formula (1), can efficiently pass the electromagnetic wave emitted by the sensor therethrough. Further, the interval L between the plurality of conductive linear bodies 22, which satisfies the relationship of "L≤20 mm" in the formula (1), is not excessively large. Thus, the pseudo sheet structure 20, which is used as a heat-generating body, can also serve as a heater capable of keeping low resistance and exhibiting uniform distribution in temperature increase.

In the pseudo sheet structure 20 according to the present exemplary embodiment, the interval L between the plurality of conductive linear bodies 22 preferably satisfies a formula (2) below.

$$0.034 \times \lambda_S \leq L \leq 0.86 \times \lambda_S \quad (2)$$

In the formula (2), L is the interval between the plurality of conductive linear bodies 22, $\lambda_S$ is a wavelength of the electromagnetic wave emitted by the sensor provided with the pseudo sheet structure 20, and the unit for each of L and $\lambda_S$ s mm.

The pseudo sheet structure 20 according to the present exemplary embodiment, in which the interval L between adjoining ones of the plurality of conductive linear bodies 22 satisfies the formula (2), can further efficiently reflect the electromagnetic wave emitted by the sensor. Further, the performance of the pseudo sheet structure 20 as a heater is also enhanced.

The interval L between the conductive linear bodies 22 is preferably 20 mm or less. With the interval L between the conductive linear bodies 22 of 20 mm or less, unevenness in in-plane heat generation of the pseudo sheet structure 20 can be restrained.

The interval L between the plurality of conductive linear bodies 22 refers to the interval between adjoining ones of the conductive linear bodies 22. It should be noted that the interval between adjoining ones of the conductive linear bodies 22 refers to a length between facing parts of the two conductive linear bodies 22 measured when the conductive linear bodies 22 are unidirectionally arranged (see FIG. 1).

When the conductive linear bodies 22 are arranged at uneven intervals, the interval L is an average of the intervals between all of the adjoining pairs of the conductive linear bodies 22. In order to, for instance, easily control the value of the interval L, the conductive linear bodies 22 are preferably arranged in the pseudo sheet structure 20 at substantially equal interval, more preferably at equal interval.

The interval L between the conductive linear bodies 22 is measured through a visual observation or observation using a digital microscope on adjoining two conductive linear bodies 22 of the pseudo sheet structure 20.

The cross-sectional shape of the conductive linear bodies 22 is not specifically limited. Examples of the cross-sectional shape of the conductive linear bodies 22 include polygons, flat-shape, ellipsoid, circle, and film-shape. The pseudo sheet structure 20 according to the present exemplary embodiment has a plurality of conductive linear bodies 22 whose cross-sectional shape is substantially circular. However, the scope of the invention is not limited to the cross-sectional shape of the conductive linear bodies 22 of the present exemplary embodiment. In terms of compatibility with the resin contained in the resin layer 30 for fixing the pseudo sheet structure 20 on the base member 10, the cross-sectional shape of the conductive linear bodies 22 is also preferably ellipsoidal or circular.

A width D of each of the conductive linear bodies 22 in a plan view of the pseudo sheet structure 20 preferably satisfies a formula (3) below.

$$D \leq 0.013 \times \lambda_S \quad (3)$$

In the formula (3), D is a width of each of the conductive linear bodies 22, $\lambda_S$ is the wavelength of the electromagnetic wave emitted by the sensor provided with the pseudo sheet structure 20, and the unit for each of D and $\lambda_S$ is mm.

The pseudo sheet structure 20 according to the present exemplary embodiment, in which the width D of the conductive linear bodies 22 satisfies the formula (3), can restrain the electromagnetic wave emitted by the sensor from being reflected by the pseudo sheet structure 20.

The conductive linear bodies 22 are linear-shaped or wave-shaped in a plan view of the pseudo sheet structure 20. Examples of the wave-shape for the conductive linear bodies 22 include sine-wave, rectangular wave, triangular wave, and saw-tooth wave. The pseudo sheet structure 20 of such a structure can restrain the conductive linear bodies 22 from breaking when the sheet-shaped conductive member 1 is stretched in the axial direction of the conductive linear bodies 22.

It should be noted that the conductive linear bodies 22 does not easily break when the sheet-shaped conductive member 1 is stretched in a direction orthogonal to the axial direction of the conductive linear bodies 22. Accordingly, the sheet-shaped conductive member 1 is sufficiently stretchable.

The number of the conductive linear bodies 22 is not specifically limited as long as the pseudo sheet structure 20 is provided with the plurality of conductive linear bodies 22. The number of the conductive linear bodies 22 provided in the pseudo sheet structure 20 is also preferably determined, for instance, in order to achieve sufficient heater function.

In the pseudo sheet structure 20, the conductive linear bodies 22 are preferably arranged at an equal interval in a direction orthogonal to the axial direction of the plurality of conductive linear bodies 22.

When the cross-sectional shape of the conductive linear bodies 22 is circular, the diameter of the conductive linear bodies 22 corresponds to the width D of the conductive linear bodies 22 shown in FIGS. 1 and 2, The diameter of each of the conductive linear bodies 22 (width D) is preferably in a range from 5 μm to 75 μm. In order to restrain an increase in the sheet resistance and to improve heating efficiency and resistance to electrical breakdown when the sheet-shaped conductive member 1 is used as a heat-generating body, the diameter (width D) of each of the conductive linear bodies 22 is preferably in a range from 8 μm to 60 μm, more preferably in a range from 12 μm to 40 μm.

When the cross section of each of the conductive linear bodies 22 is ellipsoidal, the length of the major axis of the ellipsoid is preferably in a range from 5 μm to 75 μm, more preferably in a range from 8 μm to 60 μm, further preferably in a range from 12 μm to 40 μm. When the cross section of each of the conductive linear bodies 22 is ellipsoidal, it is preferable that the major axes of the conductive linear bodies 22 are arranged along a sheet surface of the pseudo sheet structure 20.

The width D of the conductive linear bodies 22 is determined by observing the pseudo sheet structure 20 in a plan view of the pseudo sheet structure 20 using a digital microscope, measuring widths at five randomly selected points of the conductive linear bodies 22, and taking an average of the measured widths.

A volume resistivity R of the conductive linear bodies 22 is preferably in a range from $1.0 \times 10^{-9}$ Ω·m to $1.0 \times 10^{-3}$ Ω·m, more preferably in a range from $1.0 \times 10^{-8}$ Ω·m to $1.0 \times 10^{-4}$ Ω·m. Sheet resistance of the pseudo sheet structure 20 can be easily lowered when the volume resistivity R of the conductive linear bodies 22 falls within the above range.

The volume resistivity R of the conductive linear bodies 22 is measured as follows. A silver paste is applied on both ends of the conductive linear bodies 22 and the resistance at a part remote from the end by a length of 40 mm is measured to calculate the resistance value of the conductive linear bodies 22. Then, a value, which is obtained by multiplying the cross-sectional area (unit: $m^2$) of the conductive linear bodies 22 by the above resistance value, is divided by the above measurement length (0.04 m) to calculate the volume resistivity R of the conductive linear bodies 22.

The pseudo sheet structure 20 according to the present exemplary embodiment is preferably used for a sensor configured to emit an electromagnetic wave in a form of a linearly polarized wave.

It is preferable that the conductive linear bodies 22 of the pseudo sheet structure 20 according to the present exemplary embodiment are arranged so that the longitudinal axes of the conductive linear bodies 22 are inclined by an angle ranging from 70 to 110 degrees with respect to a polarized wave plane of the linearly polarized wave emitted by the sensor in which the pseudo sheet structure 20 is used.

The polarized wave plane is a plane including a vibration direction of the electric field of the linearly polarized wave component and a propagation direction of the linearly polarized wave component. FIG. 2 is a plan view schematically showing the pseudo sheet structure 20 viewed along the propagation direction of the linearly polarized wave component.

For instance, the longitudinal direction of the conductive linear bodies 22 of the pseudo sheet structure 20 is arranged in a manner inclined by an angle θ1 with respect to a polarized wave plane P1.

Further, for instance, the conductive linear bodies 22 of the pseudo sheet structure 20 are arranged so that the longitudinal direction of the conductive linear bodies 22 is inclined by an angle θ2 (specifically 90 degrees) with respect to a polarized wave plane P2.

For instance, the longitudinal direction of the conductive linear bodies 22 of the pseudo sheet structure 20 is arranged in a manner inclined by an angle θ3 with respect to a polarized wave plane P3.

The conductive linear bodies 22 of the pseudo sheet structure 20 according to the present exemplary embodiment, which are arranged so that the longitudinal direction is inclined by an angle ranging from 70 to 110 degrees with respect to the polarized wave plane of the linearly polarized wave emitted by the sensor, can restrain transmission of electromagnetic wave emitted by an oscillation source other than the sensor. Further, the interval L between the plurality of conductive linear bodies 22, which satisfies the relationship of "L≤20 mm" in the formula (1), is not excessively large, so that uneven temperature distribution during a heating step can be restrained, thereby enabling to effectively melt snow.

In other words, the pseudo sheet structure 20 according to the present exemplary embodiment also serves as a filter for the electromagnetic wave emitted by other oscillation source(s) (e.g. other sensor(s)). As a result, the pseudo sheet structure 20 can restrain malfunction of the sensor caused by the electromagnetic wave emitted by other oscillation source(s).

Accordingly, the pseudo sheet structure 20 according to the present exemplary embodiment is suitably used as an electromagnetic wave filter for restraining transmission of electromagnetic wave emitted by the oscillation source different from the sensor and also as a heating device.

In the present exemplary embodiment, the conductive linear bodies 22 are not specifically limited as long as the formula (1) is satisfied.

Examples of the conductive linear bodies 22 include linear bodies including metal wires (sometimes referred to as "metal wire linear bodies" hereinafter), linear bodies including carbon nanotube, linear bodies applied with a conductive coating, and metal foil.

The conductive linear bodies 22 are preferably metal wire linear bodies. A metal wire exhibits high heat-conductivity, high electrical conductivity, high handleability, and versatility. Accordingly, the use of the metal wire linear bodies for the conductive linear bodies 22 easily allows reduction in the resistance value of the pseudo sheet structure 20 and improvement in the light transmission properties. Further, with the conductive linear bodies 22 being in a form of the metal wire linear bodies, when the sheet-shaped conductive member 1 or the pseudo sheet structure 20 is used as the heat-generating body, heat can be easily rapidly generated. Further, as described above, the conductive linear bodies 22 having small width D or diameter can be easily produced with the use of the metal wire linear body.

The conductive linear bodies 22 are linear bodies including a metal wire in some cases. The linear bodies including a metal wire are optionally linear bodies each made of a single metal wire or linear bodies produced by spinning a plurality of metal wires.

The metal wire contains, for instance, metal such as copper, aluminum, tungsten, iron, molybdenum, nickel, titanium, silver, gold, palladium, rhodium, and platinum or an alloy containing two or more metals (e.g. steel such as stainless steel and carbon steel, brass, phosphor bronze, zirconium-copper alloy, beryllium-copper, iron-nickel, Nichrome®, nickel-titanium, KANTHAL®, HASTELLOY®, and rhenium-tungsten). Alternatively or additionally, the metal wire is optionally plated with tin, zinc, silver, nickel, chromium, nickel-chromium alloy, solder or the like, or surface-coated with later-described carbon material or polymer. Especially, a wire containing at least one metal selected from the group consisting of tungsten, molybdenum, and an alloy containing tungsten and/or molybdenum is preferable in order to provide low-volume-resistivity conductive linear bodies 22.

The metal wire is optionally coated with a carbon material. The metal wire coated with a carbon material, whose luster is reduced, easily becomes less noticeable. Further, the metal wire coated with a carbon material is restrained from metal corrosion.

Examples of the carbon material used for coating the metal wire include an amorphous carbon (e.g. carbon black, active carbon, hard carbon, soft carbon, mesoporous carbon, and carbon fiber), graphite, fullerene, graphene, and carbon nanotube.

The conductive linear bodies 22 are also preferably made of a metal foil. The conductive linear bodies 22 in a form of metal foil can also be produced by, for instance, etching a metal foil to provide the plurality of linear bodies arranged at the interval L. Alternatively, metal foils, which have been linearly shaped in advance, are optionally arranged at the interval L.

A carbon nanotube linear body is produced by, for instance, drawing a sheet of carbon nanotube from an end of a carbon nanotube forest (i.e. a grown body of a plurality of carbon nanotubes grown in a manner vertically oriented with respect to a substrate, sometimes referred to as an "array"), bundling the drawn carbon nanotube sheet, and, subsequently, spinning the bundle of the carbon nanotube. In the above production process, ribbon-shaped carbon nanotube linear body is produced when the carbon nanotube sheet is not spun after being bundled. In contrast, when the carbon nanotube sheet is spun after being bundled, thread linear body is produced. The ribbon-shaped carbon nanotube linear body is a linear body without a spun structure of the carbon nanotube. Alternatively, the carbon nanotube linear body can also be produced from a dispersion liquid of carbon nanotube through a spinning process or the like. The production of the carbon nanotube linear body by the spinning process is performed by, for instance, a method disclosed in US 2013/0251619 A (JP 2012-126635 A). The use of the thread carbon nanotube linear body is preferable in order to produce a carbon nanotube linear bodies of uniform diameter. The thread carbon nanotube linear body is preferably produced by spinning the carbon nanotube sheet in order to produce highly pure carbon nanotube linear bodies. The carbon nanotube linear body is optionally a linear body produced by knitting two or more carbon nanotube linear bodies. Alternatively, the carbon nanotube linear body is optionally a linear body produced as a composite of the carbon nanotube and other conductive material (sometimes referred to as a "composite linear body" hereinafter).

Examples of the composite linear body include (i) a composite linear body containing a single-component metal or metal alloy supported on the surface of the carbon nanotube forest, carbon nanotube sheet, or bundle of the carbon nanotube or on the surface of spun linear body through vapor deposition, ion plating, sputtering, wet plating or the like during the production process of the carbon nanotube linear body (i.e. drawing a sheet-shaped carbon nanotubes from an end of a carbon nanotube forest, bundling the drawn carbon nanotube sheet, and spinning the bundle of the carbon nanotube), (ii) a composite linear body produced by spinning the bundle of the carbon nanotubes together with a linear body or a composite linear body of a single-component metal or metal alloy, and (iii) a composite linear body produced by knitting a linear body or a composite linear body of a single-component metal or metal alloy and a linear body or a composite linear body of carbon nanotube.

It should be noted that the composite linear body of (ii) is optionally produced by supporting a metal on the carbon nanotubes in the process of spinning the bundle of the carbon nanotubes, in the same manner as the composite linear body of (i). Further, the composite linear body of (iii), which is produced by knitting two linear bodies, is optionally produced by knitting three or more linear bodies selected from the carbon nanotube linear body and a linear body or a composite linear body of single-component metal or metal alloy as long as at least one linear body or a composite linear body of a single-component metal or metal alloy is included.

Examples of the metal for the composite linear body include a single-component metal such as gold, silver, copper, iron, aluminum, nickel, chromium, tin, zinc, palladium, rhodium, and platinum and an alloy containing at least one of the single-component metals (e.g. copper-nickel-phosphorous alloy and copper-iron-phosphorus-zinc alloy).

The conductive linear bodies 22 are optionally threads applied with a conductive coating. Examples of the thread include a thread spun from a resin such as nylon and polyester. Examples of the conductive coating include a coating of metal, conductive polymer, and carbon material. The conductive coating can be provided by plating, vapor deposition, or the like. The linear body in a form of a thread applied with a conductive coating can improve the conductivity of the linear body while keeping flexibility of the thread. In other words, the resistance of the pseudo sheet structure 20 can be easily lowered.

Base Member

The pseudo sheet structure 20 of the sheet-shaped conductive member 1 according to the present exemplary embodiment is preferably supported by the base member 10.

The material of the base member 10 is not specifically limited as long as the base member 10 is capable of supporting the pseudo sheet structure 20.

Examples of the base member 10 include a paper, synthetic resin film, cured film of a curable resin, metal foil, nonwoven fabric, cloth, and glass film. Examples of the thermoplastic resin film include resin films such as a polyester film, polycarbonate film, polyimide film, polyolefin film, polyurethane film, and acrylic film. The base member 10 is also preferably in a form of a plate.

In order to provide optical transparency to the sheet-shaped conductive member 1, the base member 10 is preferably light transmissive.

Resin Layer

The pseudo sheet structure 20 of the sheet-shaped conductive member 1 according to the present exemplary embodiment is preferably fixed on the base member 10 through the resin layer 30. The resin layer 30 allows the pseudo sheet structure 20 to be easily fixed on the surface of the base member 10.

The conductive linear bodies 22 are preferably embedded in the resin layer 30 on the base member 10 of the sheet-shaped conductive member 1 according to the present exemplary embodiment. The conductive linear bodies 22 are not entirely buried in the resin layer 30 but are exposed on the surface of the resin layer 30. The conductive linear bodies 22, which are embedded in the resin layer 30, can be restrained from being shifted.

In order to provide optical transparency to the sheet-shaped conductive member 1, the resin layer 30 is preferably light transmissive.

The resin layer 30 contains a resin. The type of the resin contained in the resin layer 30 is not specifically limited. The resin contained in the resin layer 30 is curable or optionally non-curable. The resin layer 30 preferably contains a curable resin. The curable resin, when being contained in the resin layer 30, is capable of being cured to provide hardness sufficient to protect the pseudo sheet structure 20. Shock-resistance of the cured resin layer 30 is also improvable, thus restraining deformation of the resin sheet 30 due to shock. The curable resin contained in the resin layer 30 is preferably curable by an energy ray (e.g. ultraviolet, visible energy ray, infrared ray, and electron ray) for the convenience of easily curing the resin layer 30 within a short time. It should be noted that the term "curable by an energy ray" encompasses thermal cure caused by heating with the energy ray.

A single type of the resin or two or more types of the resins are contained in the resin layer 30.

The resin layer 30, which is used for fixing the pseudo sheet structure 20 of the sheet-shaped conductive member 1 on the base member 10 according to the present exemplary embodiment, preferably contains a cured product of the curable resin.

It is also preferable that the resin layer 30 contains an adhesive as a component of the resin. Examples of the adhesive contained in the resin layer 30 include a so-called heat-seal adhesive that can adhere by heat, and an adhesive whose adhesiveness is achievable when being wet. In view of convenience for application on the sheet-shaped conductive member 1, the adhesive contained in the resin layer 30 is preferably a sticky agent (pressure-sensitive adhesive). The sticky agent contained in the resin layer 30 is not specifically limited. Examples of the sticky agent include an acrylic sticky agent, urethane sticky agent, rubber sticky agent, polyester sticky agent, silicone sticky agent, and polyvinylether sticky agent. Among the above, the sticky agent is preferably at least one sticky agent selected from the group consisting of an acrylic sticky agent, urethane sticky agent, and rubber sticky agent, more preferably an acrylic sticky agent.

The adhesive contained in the resin layer 30 is preferably a curable adhesive, more preferably a curable sticky agent (pressure-sensitive adhesive). Examples of the curable adhesive include an energy-ray curable adhesive, thermally curable adhesive, and naturally curable adhesive. The adhesive contained in the resin layer 30 is preferably an energy-ray curable adhesive, which is curable within a short time, in view of productivity.

A suitable example of the energy-ray curable adhesive is a radically-curable adhesive. Examples of the radically curable adhesive include an energy-ray curable adhesive such as an electro-ray curable adhesive and ultraviolet curable adhesive. The energy-ray curable adhesive is especially preferably the one curable within a short time, in which an ultraviolet curable adhesive that is curable with a low energy is preferable.

The resin layer 30 optionally contains an inorganic filler. The presence of the inorganic filler further improves the hardness of the resin layer 30 after the resin layer 30 is cured. In addition, heat conductivity of the resin layer 30 is improved. Further, when the main component of the adherend is glass, the linear expansion coefficient of the sheet-shaped conductive member 1 can be made dose to the linear expansion coefficient of the adherend, thereby improving reliability of a device produced by attaching (and curing, as necessary) the sheet-shaped conductive member 1 on the adherend.

Examples of the inorganic filler include inorganic powder (e.g. powder of silica, alumina, talc, calcium carbonate, titanium white, colcothar, silicon carbide, and boron nitride), beads produced by spheronizing the inorganic powder, monocrystalline fiber, and glass fiber. Among the above, silica filler and alumina filler are preferable as the inorganic filler. One type of the above inorganic fillers is usable in solo, or two or more types of the inorganic fillers are usable in combination.

The resin layer 30 optionally contains other component(s). Examples of the other component(s) include known additives such as an organic solvent, flame retardant, tackifier, ultraviolet absorber, antioxidant, preservative, fungicide, plasticizer, antifoaming agent, and wettability adjuster.

The thickness of the resin layer 30 is suitably determined in accordance with the usage of the sheet-shaped conductive member 1. For instance, in view of adhesiveness, the thickness of the resin layer 30 is preferably in a range from 3 μm to 150 μm, more preferably in a range from 5 μm to 100 μm.

Method of Producing Pseudo Sheet Structure and Sheet-Shaped Conductive Member

The method for producing the pseudo sheet structure and sheet-shaped conductive member according to the present exemplary embodiment is not specifically limited. The pseudo sheet structure and the sheet-shaped conductive member are produced, for instance, according to the following steps.

Initially, a laminate of the base member 10 and the resin layer 30 formed on the base member 10 is prepared. Then, the conductive linear bodies 22 are arranged on the surface of the resin layer 30 to form the pseudo sheet structure 20. For instance, after the resin layer 30 attached with the base member 10 is provided to an outer circumferential surface of a drum member, the conductive linear bodies 22 are helically wound on the resin layer 30 while the drum member is rotated. Then, a bundle of the helically wound conductive linear bodies 22 is cut along an axial direction of the drum member. The pseudo sheet structure 20 is thus formed and is simultaneously provided on the resin layer 30. Then, the base member 10 provided with the pseudo sheet structure 20 on the resin layer 30 is detached from the drum member. The sheet-shaped conductive member 1 including the base member 10, the resin layer 30, and the pseudo sheet structure 20 is produced through these steps. According to the above-described process, by, for instance, moving a feed portion of the conductive linear bodies 22 in a direction parallel to the axis of the drum member while the drum member is rotated, the interval L of adjoining ones of the conductive linear bodies 22 of the pseudo sheet structure 20 can be easily adjusted to satisfy the formula (1) or the formula (2).

In another method for producing the pseudo sheet structure according to the present exemplary embodiment, the conductive linear bodies 22 are arranged at the interval L satisfying the above formula (1) or the formula (2) to produce the pseudo sheet structure 20. The produced pseudo sheet structure 20 is optionally attached on the resin layer 30 of a laminate including the base member 10 and the resin layer 30 to produce the sheet-shaped conductive member 1.

Properties of Sheet-Shaped Conductive Member and Pseudo Sheet Structure Electromagnetic Wave Transmittance Electromagnetic wave transmittance (in the bandwidth ranging from 20 GHz to 110 GHz) of the pseudo sheet structure 20 according to the present exemplary embodiment is preferably 60% or more, more preferably in a range from 70% to 100%, further preferably in a range from 80% to 100%.

The pseudo sheet structure 20 having the above electromagnetic wave transmittance can further efficiently transmit the electromagnetic wave emitted by a sensor.

The electromagnetic wave transmittance in the bandwidth ranging from 20 GHz to 110 GHz can be measured by a free-space S-parameter method using a vector network analyzer ("N5290A" manufactured by Keysight Technologies, Inc.).

Light Transmittance

Light transmittance of the sheet-shaped conductive member 1 and the pseudo sheet structure 20 according to the present exemplary embodiment is preferably 70% or more, more preferably in a range from 70% to 100%, further preferably in a range from 80% to 100%.

With the light transmittance of 70% or more, the design of the appearance of the adherend is less likely to be impaired when the sheet-shaped conductive member 1 or the pseudo sheet structure 20 is attached on the surface of the adherend.

It should be noted that the light transmittance of the sheet-shaped conductive member 1 and the pseudo sheet structure 20 is an average of measurements of the light transmittance in a visible range (in a range from 380 nm to 760 nm) measured by a light transmittance meter.

Using Method of Sheet

The sheet-shaped conductive member 1 according to the present exemplary embodiment is, for instance, attached on an adherend in use. When the resin layer 30 contains the curable resin, the resin layer 30 is cured after the sheet-shaped conductive member 1 is attached on the adherend. In order to attach the sheet-shaped conductive member 1 on the adherend, the sheet-shaped conductive member 1 is optionally attached to the adherend at a side provided with the pseudo sheet structure 20 (i.e. the pseudo sheet structure 20 is interposed between the resin layer 30 and the adherend) or, alternatively, at a side of the base member 10 of the sheet-shaped conductive member 1 that is not provided with the resin layer 30.

The base member 10 is optionally peeled from the cured resin layer 30 after the sheet-shaped conductive member 1 is attached on the adherend at the side of the pseudo sheet structure 20 and the resin layer 30 is cured. Even when the base member 10 is thus peeled off, the pseudo sheet structure 20 can be sufficiently protected between the adherend and the cured resin layer 30, thus providing shock-resistance to the pseudo sheet structure 20.

When the sheet-shaped conductive member 1 or the pseudo sheet structure 20 is used as a heat-generating body, the resin layer 30 also contributes to prevention of electric shock when at the time of heat generation (i.e. when the sheet-shaped conductive member 1 or the pseudo sheet structure 20 is powered on).

The sheet-shaped conductive member 1 or the pseudo sheet structure 20 according to the present exemplary embodiment is suitably usable as a snow-melting heater for a radar component of a millimeter-wave radar. The sheet-shaped conductive member 1 or the pseudo sheet structure 20 according to the present exemplary embodiment is preferably used for a millimeter-wave radar installed in an automobile. The millimeter-wave radar is configured to detect a detection target using an electromagnetic wave of a millimeter wave band (approximately in a range from 60 GHz to 80 GHz: for instance, 76 GHz (wavelength 3.9 mm) or 79 GHz (wavelength 3.8 mm)). Water drop and snow, whose electromagnetic wave absorbance is high, make it difficult to detect electromagnetic wave when attached on a top layer of the radar.

In the sheet-shaped conductive member 1 or the pseudo sheet structure 20 according to the present exemplary embodiment, the conductive linear bodies 22 are arranged at the appropriate interval, which is defined in accordance with the frequency (or wavelength) of the electromagnetic wave emitted by the sensor and is represented by the formula (1) or the formula (2). Accordingly, the sheet-shaped conductive member 1 or the pseudo sheet structure 20 according to the present exemplary embodiment exhibits a heater function to efficiently remove water drops and/or snow while efficiently transmitting the electromagnetic wave.

Further, the pseudo sheet structure according to the present exemplary embodiment, which easily transmits the electromagnetic wave of the frequency bandwidth used in the fifth generation mobile communication system (e.g. 28 GHz (wavelength 10.7 mm) or 39 GHz (wavelength 7.7 mm)), is suitably usable for a sensor that emits electromagnetic wave of 5G bandwidth.

Figure 3:
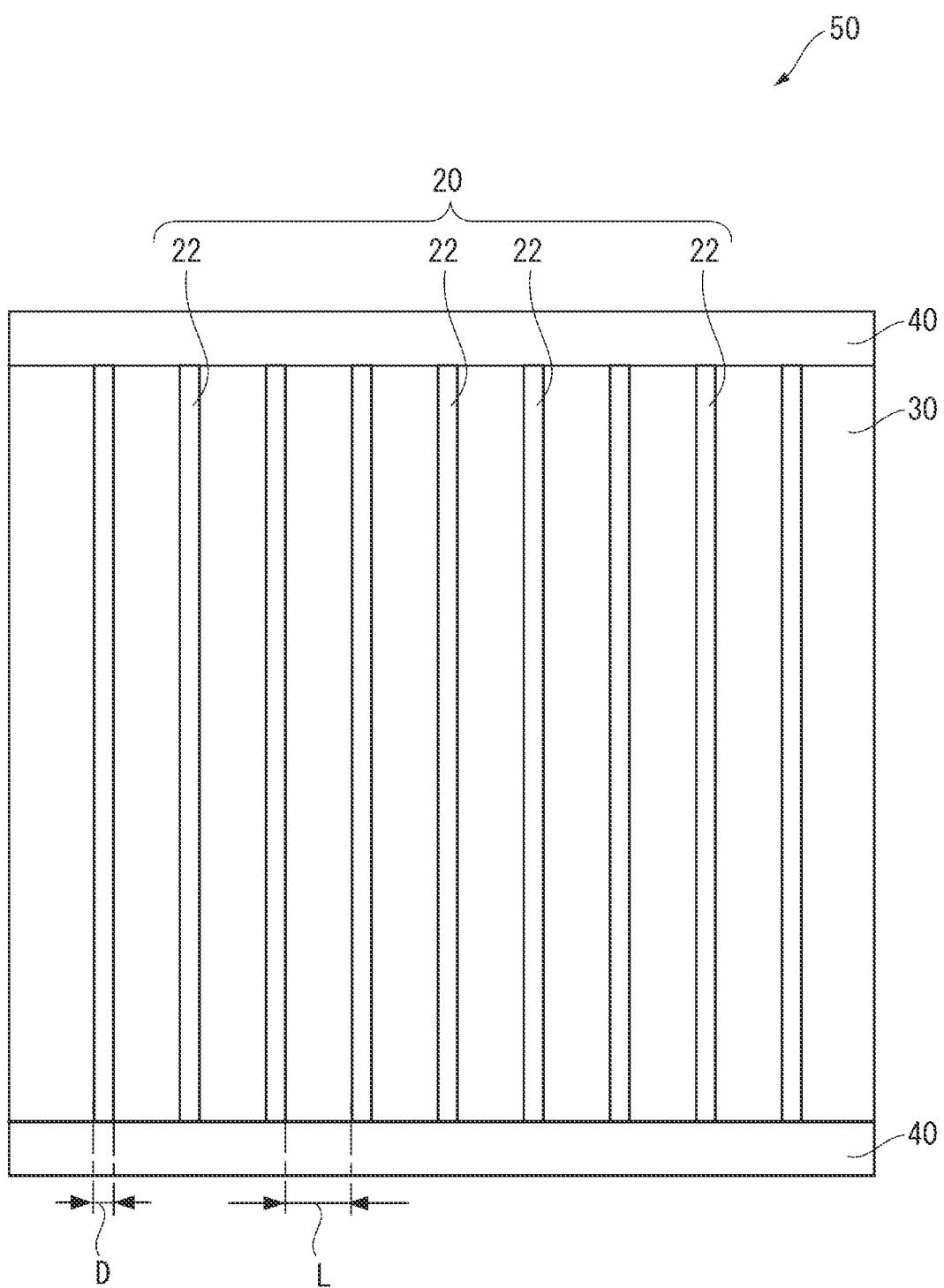
FIG. 3 is a plan view schematically showing a heat generating device including electrodes and the pseudo sheet structure according to an exemplary embodiment.

In addition, the sheet-shaped conductive member 1 or the pseudo sheet structure 20 is also preferably used as a heat-generating body of a heat generating device 50. As an example, FIG. 3 schematically shows an outline of the heat generating device 50 in a plan view.

The heat generating device 50 includes the heat-generating body (the sheet-shaped conductive member 1 or the pseudo sheet structure 20 of the present exemplary embodiment) according to the present exemplary embodiment and electrodes 40 configured to supply electric power to the pseudo sheet structure 20 of the heat-generating body.

Electrodes

The electrodes 40 are used in order to supply electric current to the conductive linear bodies 22. The electrodes 40 are provided to be electrically connected on respective ends of the conductive linear bodies 22.

The electrodes 40 are preferably band-shaped because the band-shaped electrodes 40 can secure sufficient contact area with the conductive linear bodies 22 even when the width D and/or diameter of each of the conductive linear bodies 22 is small. Electrically conductive foil or plate is usable for the electrodes 40.

Specific examples of the metal used for the foil or plate for the electrodes 40 include gold, silver, copper, nickel, iron, aluminum, tungsten, molybdenum, palladium, rhodium, platinum, and titanium. Alternatively, the electrodes 40 are optionally a foil or plate of an alloy containing the above and other metal element(s) and non-metal element(s), the alloy being exemplified by stainless steel, carbon steel, brass, phosphor bronze, zirconium-copper alloy, beryllium-copper, iron-nickel, Nichrome®, nickel-titanium, KANT-HAL®, HASTELLOY®, and rhenium-tungsten. Further alternatively, the electrodes 40 are optionally a band-shaped component containing a carbon material such as carbon nanotube, carbon nanofiber, and graphene. Still further alternatively, the electrodes 40 are optionally laminates of a plastic film and one of the above metal foil or plate, the above alloy foil or plate, and the band-shaped component containing the carbon material.

Alternatively, the electrodes 40 are optionally produced by solidifying a liquid conductive material (i.e. electrodes made of solidified product of the liquid conductive material) in order to ensure excellent connection between the conductive linear bodies 22 and the electrodes 40. A typical example of the liquid conductive material is an electrically conductive paste. Examples of the electrically conductive paste include a paste produced by dispersing metal or carbon particles in a binder resin and/or organic solvent. Examples of the metal particles include particles of gold, silver, copper, and nickel. Examples of the binder resin include known resins such as polyester resin, polyurethane resin, epoxy resin, and phenol resin.

It should be noted that the examples of the liquid conductive material include solder, electrically conductive ink and the like in addition to the electrically conductive paste.

The electrodes 40 are optionally made of a combination of electrically conductive foil or plate and the liquid conductive material. The electrically conductive foil or plate is optionally attached after the liquid conductive material is applied on the pseudo sheet structure 20. Alternatively, the liquid conductive material is optionally applied after the electrically conductive foil or plate, which is provided with through hole(s), is attached on the pseudo sheet structure 20.

The use of both of the electrically conductive foil or plate and the liquid conductive material further enhances connection between the electrodes 40 and the conductive linear bodies 22.

Additionally or alternatively, a plurality of conductive linear bodies 22 densely arranged is optionally used as the electrodes 40.

The ratio between the resistance values of the electrodes 40 and the pseudo sheet structure 20 is preferably in a range from 0.0001 to 0.3, more preferably in a range from 0.0005 to 0.1. The ratio between the resistance values of the electrodes 40 and the pseudo sheet structure 20 can be calculated by "the resistance value of the electrodes 40/the resistance value of the pseudo sheet structure 20." Abnormal heat generation at the electrodes can be restrained at the ratio falling within the above range of the resistance values of the electrodes 40 and the pseudo sheet structure 20 when the sheet-shaped conductive member 1 is used as the heat-generating body. When the pseudo sheet structure 20 is used as a film heater, heat is generated only at the pseudo sheet structure 20, thereby providing a film heater with excellent heat generation efficiency.

The resistance values of the electrodes 40 and the pseudo sheet structure 20 can be measured using a tester. Initially, the resistance value of the electrodes 40 is measured. Then, the resistance value of the pseudo sheet structure 20 attached with the electrodes 40 is measured. Subsequently, the measurements of the electrodes 40 are subtracted from the measurements of the resistance value of the pseudo sheet structure 20 attached with the electrodes, thereby calculating the respective resistance values of the electrodes 40 and the pseudo sheet structure 20.

A thickness of each of the electrodes 40 is preferably in a range from 2 μm to 200 μm, more preferably in a range from 2 μm to 120 μm, further preferably in a range from 10

μm to 100 μm. At the thickness of the electrodes within the above range, electric conductivity can be increased and the resistance can be lowered, thereby keeping the resistance value with the pseudo sheet structure at a low level. Further, strength sufficient for the electrodes can be achieved.

According to the present exemplary embodiment, a pseudo sheet structure capable of efficiently transmitting electromagnetic wave and having a heater function can be provided. Further, a sheet-shaped conductive member including a pseudo sheet structure capable of efficiently transmitting an electromagnetic wave and having a heater function can be provided by the present exemplary embodiment.

Second Exemplary Embodiment

Sensor System

Next, a second exemplary embodiment of the invention will be described below.

The present exemplary embodiment relates to a sensor system. Differences from the first exemplary embodiment will be mainly described below, omitting or simplifying explanation for duplicated components. Components of the same or substantially the same structures as those of the first exemplary embodiment will be denoted by the same reference numerals, omitting or simplifying description thereof.

A sensor system according to the present exemplary embodiment includes the pseudo sheet structure according to the above-described exemplary embodiment and a sensor configured to emit an electromagnetic wave whose bandwidth is in a range from 20 GHz to 100 GHz.

Alternatively, the sensor system according to the present exemplary embodiment includes the sheet-shaped conductive member according to the above-described exemplary embodiment and a sensor configured to emit an electromagnetic wave whose bandwidth is in a range from 20 GHz to 100 GHz.

Figure 4:
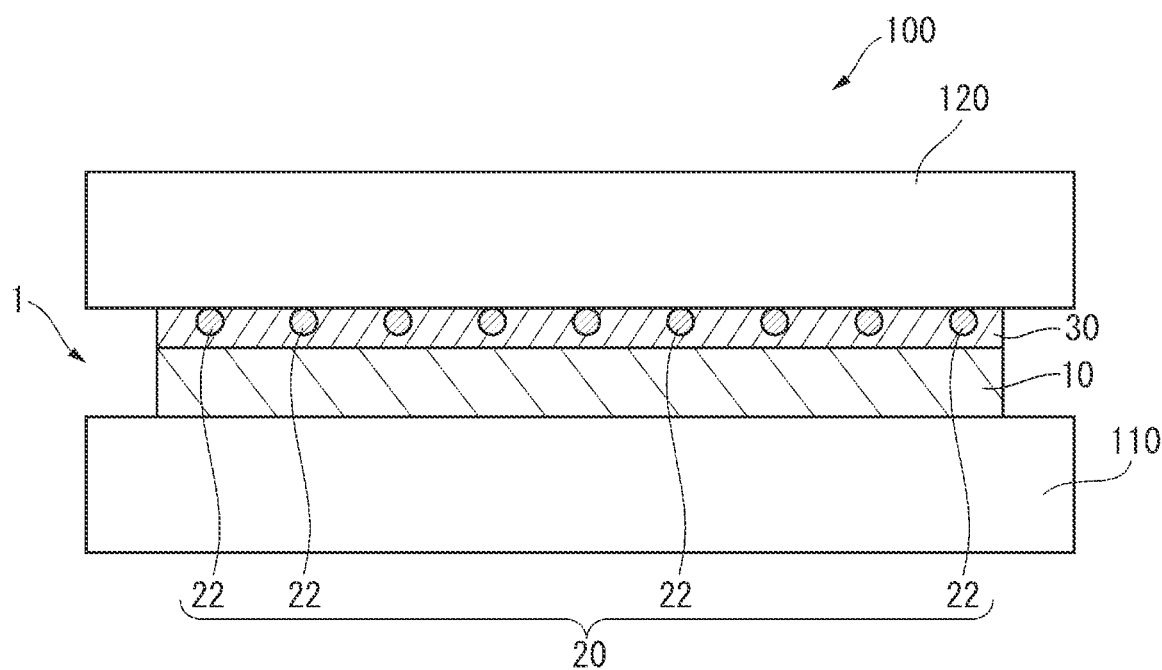
FIG. 4 is a cross-sectional view schematically showing a sensor system including a sensor and the pseudo sheet structure according to an exemplary embodiment.

FIG. 4 is a schematic cross-sectional view of a sensor system 100 according to the present exemplary embodiment.

The sensor system 100 according to the present exemplary embodiment includes the sheet-shaped conductive member 1 and a sensor 110. The sensor system 100 according to the present exemplary embodiment further includes a protection member 120.

The sheet-shaped conductive member 1 is preferably interposed between the sensor 110 and the protection member 120 as shown in FIG. 4. As shown in FIG. 4, the sheet-shaped conductive member 1 is configured such that a side provided with the resin layer 30 and a side provided with the base member 10 respectively face the protection member 120 and the sensor 110. However, the invention is not limited to this arrangement. For instance, the side provided with the resin layer 30 and the side provided with the base member 10 of the sheet-shaped conductive member 1 may face the sensor 110 and the protection member 120, respectively.

In the sensor system 100 according to the present exemplary embodiment, the interval L between the conductive linear bodies 22 of the pseudo sheet structure 20 preferably satisfies the formula (1) defined in accordance with the frequency of the electromagnetic wave emitted by the sensor 110, and also preferably satisfies the formula (2).

In the sensor system 100 according to the present exemplary embodiment, the width D of the conductive linear bodies 22 of the pseudo sheet structure 20 preferably satisfies the formula (3) defined in accordance with the frequency of the electromagnetic wave emitted by the sensor 110.

The sensor 110 of the sensor system according to the present exemplary embodiment is preferably a sensor configured to emit an electromagnetic wave in a form of a linearly polarized wave.

In the sensor system 100 according to the present exemplary embodiment, the conductive linear bodies 22 of the pseudo sheet structure 20 are preferably arranged so that the longitudinal direction is inclined by an angle ranging from 70 to 110 degrees with respect to the polarized wave plane of the linearly polarized wave emitted by the sensor 110, Further, it is preferable that the pseudo sheet structure 20 is fixed so that the pseudo sheet structure 20 satisfies the above inclination range with respect to the sensor 110. The inclination angle is more preferably in a range 80 to 100 degrees, further preferably in a range 85 to 95 degrees.

In the sensor system 100 according to the present exemplary embodiment, the conductive linear bodies 22, which are arranged so that the longitudinal direction is inclined by an angle ranging from 70 to 110 degrees with respect to the polarized wave plane of the linearly polarized wave emitted by the sensor 110, can restrain transmission of an electromagnetic wave emitted by an oscillation source other than the sensor 110. Further, the interval L between the plurality of conductive linear bodies 22, which satisfies the relationship of "L 20 mm" in the formula (1), is not excessively large, so that the transmission of electromagnetic wave emitted by the other oscillation source can be restrained.

Specifically, when the inclination angle of the longitudinal direction of the conductive linear bodies 22 with respect to the polarized wave plane of the electromagnetic wave satisfies the above range, the sensor system 100 according to the present exemplary embodiment also serves as a shield for the electromagnetic wave emitted by other oscillation source (e.g. other sensor(s)). As a result, the sensor 110 of the sensor system 100 is unlikely to cause malfunction due to an electromagnetic wave received from an outside.

Modification of Exemplary Embodiment

The invention is not limited to the above-described exemplary embodiments but includes modifications, improvements and the like as long as such modifications, improvements, and the like are compatible with an object of the invention.

The plurality of conductive linear bodies 22, which are exemplarily supported by the base member 10 in the above-described exemplary embodiments, are not necessarily configured as described above for the invention. For instance, in the sheet-shaped conductive member, the plurality of conductive linear bodies 22 may be supported by the resin layer 30. In this case, the pseudo sheet structure 20 can be attached onto the adherend via the resin layer 30 when the resin layer 30 has adhesivity.

The sheet-shaped conductive member 1, which includes the electrodes 40 in the above-described exemplary embodiment, is not necessarily configured as described above for the invention. For instance, the sheet-shaped conductive member 1 optionally does not include the electrodes 40. The electrodes 40 are optionally provided in advance on an article for the sheet-shaped conductive member to be attached and the sheet-shaped conductive member is optionally attached so that the pseudo sheet structure 20 is in contact with the electrodes 40.

EXAMPLES

The invention will be described in further detail with reference to Examples. It should be noted that the scope of the invention is by no means limited to Examples.

Example 1

A sticky sheet was wound on a rubber drum. The used sticky sheet was a laminate of an acrylic film ("ACRYPLEN" manufactured by Mitsubishi Chemical Corporation, thickness: 75 μm) as the base member and a sheet (size: 120 mm×120 mm) provided with a sticky agent layer ("PK" manufactured by Lintec Corporation, thickness: 20 μm) laminated on the base member. The sticky sheet was wound on the rubber drum so that a sticky surface of the sticky agent layer faced outside and the sticky sheet was unwrinkled. After the sticky sheet was wound, both ends of the sticky sheet in the circumferential direction of the rubber drum were fixed by a double-sided tape.

Stainless conductive linear bodies ("SUS304" manufactured by TOKUSAI TungMoly Co., LTD., diameter D: 35 μm) wound around a bobbin were attached on the surface of the sticky sheet located near an end of the rubber drum. Subsequently, while being unwound from the bobbin, the linear bodies were wound on the rubber drum. When the linear bodies were wound, the rubber drum was moved little by little in a direction parallel to an axis of the drum to draw a helix with a constant interval in winding the linear bodies on the rubber drum.

Then, the sticky sheet was cut together with the stainless linear bodies to produce a sheet-shaped conductive member in a form of a laminate of the sticky sheet and the pseudo sheet structure provided with the stainless linear bodies.

The linear bodies of the pseudo sheet structure each had the diameter D of 35 μm and were arranged at the interval L of 0.130 mm.

Further, an acrylic film attached with electrodes (adherend) was prepared. The acrylic film attached with the electrodes was prepared by attaching a pair of electrodes in a form of copper tapes (width: 10 mm, length: 130 mm, thickness: 35 μm) on an acrylic film ("ACRYPLEN" manufactured by Mitsubishi Chemical Corporation, thickness: 75 μm).

The prepared sheet-shaped conductive member and the acrylic film attached with the electrodes were mutually attached, where the copper tapes (electrodes) were electrically connected to both ends of the stainless linear bodies. A heat generating device according to Example 1 was thus prepared.

Example 2

A heat generating device according to Example 2 was prepared in the same manner as Example 1 except that the conductive linear bodies were replaced with tungsten conductive linear bodies ("TWG-CS" manufactured by TOKUSAI TungMoly Co., LTD., diameter D: 14 μm) and the interval L between the conductive linear bodies was changed to 1.000 mm.

Example 3

The heat generating device according to Example 3 was prepared in the same manner as Example 1 except that the conductive linear bodies were replaced with a gold-plated stainless wire ("SUS304-Aup" manufactured by TOKUSAI TungMoly Co., LTD., diameter D: 35 μm) and the interval L between the conductive linear bodies was changed to 3.000 mm.

Example 4

A heat generating device according to Example 4 was prepared in the same manner as Example 2 except that the interval L between the tungsten linear bodies (conductive linear bodies) was changed to 3.000 mm.

Example 5

A heat generating device according to Example 5 was prepared in the same manner as Example 1 except that the conductive linear bodies in a form of the stainless linear bodies were changed to nickel wire ("Ni wire" manufactured by TOKUSAI TungMoly Co., LTD., diameter D: 30 μm) and the interval L between the conductive linear bodies was changed to 9 mm.

Comparative 1

The heat generating device according to Comparative 1 was prepared in the same manner as Example 1 except that the interval L between the conductive linear bodies was changed to 0.100 mm.

Comparative 2

A heat generating device according to Comparative 2 was prepared in the same manner as Example 2 except that the interval L between the conductive linear bodies was changed to 25 mm.

Transmittance Measurement Method

Figure 5:
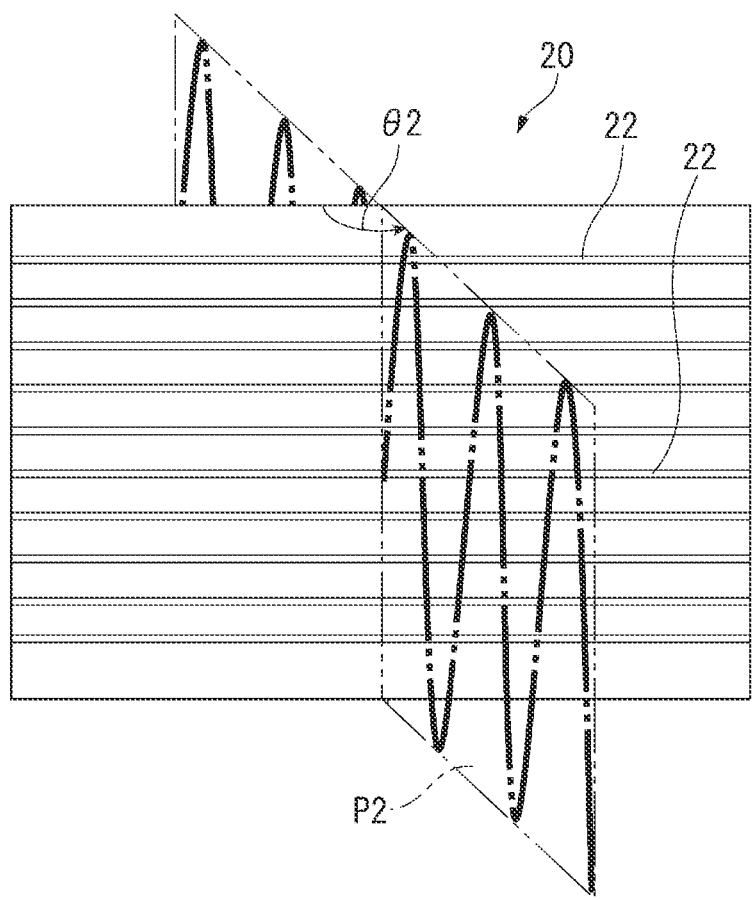
FIG. 5 is a perspective view schematically showing an arrangement of a longitudinal direction of conductive linear bodies and a polarized wave plane of a linearly polarized wave.
Figure 6:
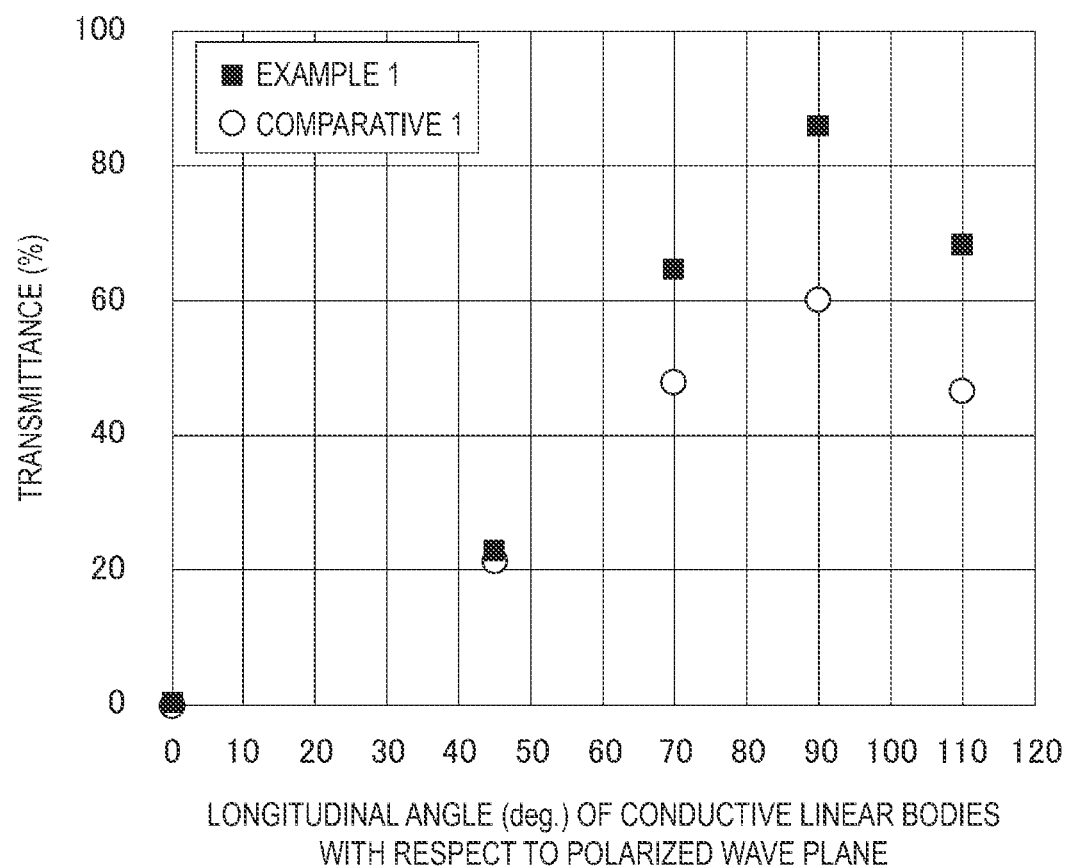
FIG. 6 is a graph showing a relationship between a longitudinal angle of the conductive linear bodies with respect to the polarized wave plane and electromagnetic wave transmittance.

Electromagnetic wave transmittance (S21) of the prepared heat generating devices for frequencies emitted by a sensor was measured by a free-space S-parameter method using a vector network analyzer ("N5290A" manufactured by Keysight Technologies, Inc.) in a band ranging from 20 GHz to 110 GHz while changing the angle between the polarized wave plane and the conductive linear bodies as shown in Table 1. The angle, which is the angle θ2 of the longitudinal direction of the conductive linear bodies 22 with respect to the polarized wave plane P2 of the emitted linearly polarized wave as shown in FIG. 5, was adjusted to the inclination angle shown in Table 1 for measurement. The unit for calculation of the electromagnetic wave transmittance was %. FIG. 5 is a perspective view schematically showing the pseudo sheet structure 20, in which the longitudinal angle (i.e. angle in the longitudinal direction) of the conductive linear bodies 22 is inclined by the angle θ2 of 90 degrees, FIG. 6 is a graph showing a relationship between the longitudinal angle of the conductive linear bodies with respect to the polarized wave plane and an electromagnetic wave transmittance.

Heating Efficiency Check, Temperature Increase Test

A temperature increase ΔT at or near the center of a heat-generation area, when heat was stably generated without unevenness in temperature distribution, of the prepared heat generating device was measured at an output condition of 0.1 W/cm$^2$ using a thin-film thermocouple ("GMT-TC-SB7.5(P)" manufactured by Geomatec Co., Ltd.). The unit for the temperature increase ΔT is K (kelvin). When there was large unevenness in temperature distribution in the heat generation area, it was determined that "Large Unevenness in Temperature Distribution" was observed.

TABLE 1

| | Sensor Emission Frequency $f_s$ (Hz) | Sensor Emission Wavelength $\lambda_s$ (mm) | Formula (1) 0.034 × $\lambda_s$ (mm) | Formula (2) 0.86 × $\lambda_s$ (mm) | Formula (3) 0.013 × $\lambda_s$ (mm) | Conductive Linear Body | | Interval L between Linear Bodies (mm) | Longitudinal Angle of Conductive Linear Body with Respect to Polarized Wave Plane (degrees) | Pseudo Sheet Structure | |
|---|---|---|---|---|---|---|---|---|---|---|---|
| | | | | | | Linear Body Diameter D (μm) | Heater Element | | | Electromagnetic Wave Transmittance (%) | Temperature Increase ΔT (K) |
| Ex. 1 | 79 | 3.8 | 0.129 | 3.268 | 0.049 | 35 | Stainless | 0.130 | 90 | 85 | 65 |
| Ex. 2 | 79 | 3.8 | 0.129 | 3.268 | 0.049 | 14 | Tungsten | 1.000 | 70 | 89 | 59 |
| Ex. 3 | 79 | 3.8 | 0.129 | 3.268 | 0.049 | 35 | Stainless (Gold-Plated) | 3.000 | 110 | 90 | 60 |
| Ex. 4 | 28 | 10.7 | 0.364 | 9.202 | 0.139 | 14 | Tungsten | 3.000 | 90 | 98 | 58 |
| Ex. 5 | 28 | 10.7 | 0.364 | 9.202 | 0.139 | 30 | Nickel | 9 | 70 | 93 | 54 |
| Comp. 1 | 79 | 3.8 | 0.129 | 3.268 | 0.049 | 35 | Stainless | 0.100 | 45 | 25 | 64 |
| Comp. 2 | 79 | 3.8 | 0.129 | 3.268 | 0.049 | 14 | Tungsten | 25 | 90 | 95 | Large Unevenness in Temperature Distribution |

The pseudo sheet structures provided in the heat generating devices according to Examples 1 to 5, which included the plurality of conductive linear bodies at the interval L satisfying the formula (1), exhibited excellent electromagnetic wave transmittance and heating efficiency. The pseudo sheet structures according to Examples 1 to 5 efficiently transmitted the electromagnetic wave while exhibiting a heater function.

The pseudo sheet structure provided in the heat generating device according to Comparative 1, where the intervals between the conductive linear bodies were narrow and the inclination angle of the conductive linear bodies with respect to the polarized wave plane was large, exhibited low electromagnetic wave transmittance. The pseudo sheet structure provided in the heat generating device according to Comparative 2, whose linear bodies were not arranged at the interval L satisfying the formula (1), exhibited large unevenness in heat distribution. It is believed that this is because the interval between the plurality of conductive linear bodies in the pseudo sheet structure according to Comparative 2 was too wide.

The invention claimed is:

1. A pseudo sheet structure used for a sensor configured to emit an electromagnetic wave in a band ranging from 20 GHz to 100 GHz, the pseudo sheet structure comprising:
a plurality of conductive linear bodies arranged at an interval therebetween, wherein the interval L between the plurality of conductive linear bodies is determined by a formula (1) below, $$0.034 \times \lambda_S \leq L \leq 20 \text{ mm} \qquad \text{(formula 1)}$$

where $\lambda_S$ is a wavelength of the electromagnetic wave emitted by the sensor, and a unit for each of L and $\lambda_S$ is mm.

2. The pseudo sheet structure according to claim 1, wherein the interval L between the plurality of conductive linear bodies is determined by a formula (2) below, $$0.034 \times \lambda_S << 0.86 \times \lambda_S \qquad \text{(formula 2)}$$

where $\lambda_S$ is the wavelength of the electromagnetic wave emitted by the sensor, and the unit for each of L and $\lambda_S$ is mm.

3. The pseudo sheet structure according to claim 1, wherein a width D of each of the conductive linear bodies in a plan view of the pseudo sheet structure satisfies is determined by a formula (3) below, $$D \leq 0.013 \times \lambda_S \qquad \text{(formula 3)}$$

where $\lambda_S$ is the wavelength of the electromagnetic wave emitted by the sensor, and the unit for each of D and $\lambda_S$ is mm.

4. The pseudo sheet structure according to claim 1, wherein
the electromagnetic wave emitted by the sensor is a linearly polarized wave, and
the conductive linear bodies are arranged so that a longitudinal direction of the conductive linear bodies is inclined in a range from 70 to 110 degrees with respect to a polarized wave plane of the linearly polarized wave.

5. The pseudo sheet structure according to claim 1, wherein
the pseudo sheet structure is used as a heating device and as an electromagnetic wave filter for restraining transmission of an electromagnetic wave emitted by an oscillation source different from the sensor.

6. A sheet-shaped conductive member comprising:
the pseudo sheet structure according to claim 1; and
a base member that supports the pseudo sheet structure.

7. The sheet-shaped conductive member according to claim 6, wherein the pseudo sheet structure is fixed on the base member through a resin layer.

8. The sheet-shaped conductive member according to claim 7, wherein the resin layer comprises a cured product of a curable resin.

9. A sensor system comprising:
the sheet-shaped conductive member according to claim 6; and
the sensor configured to emit the electromagnetic wave in the band ranging from 20 GHz to 100 GHz.

10. A sensor system comprising:
the pseudo sheet structure according to claim 1; and
the sensor configured to emit the electromagnetic wave in the band ranging from 20 GHz to 100 GHz.

* * * * *